(12) United States Patent
Lee et al.

(10) Patent No.: US 10,053,571 B2
(45) Date of Patent: Aug. 21, 2018

(54) POLYMER EMULSION HAVING HEAT SEALABILITY FOR BLISTER PACKAGE AND PREPARATION METHOD THEREOF

(71) Applicant: HANWHA CHEMICAL CORPORATION, Seoul (KR)

(72) Inventors: Su Jin Lee, Daejeon (KR); Dae Won Cho, Seoul (KR); Jeong Hyun Choi, Daejeon (KR); Sang Hyun Cho, Daejeon (KR)

(73) Assignee: HANWHA CHEMICAL CORPORATION, Seoul (KR)

( * ) Notice: Subject to any disclaimer, the term of this patent is extended or adjusted under 35 U.S.C. 154(b) by 0 days.

(21) Appl. No.: 15/324,805

(22) PCT Filed: Jul. 8, 2015

(86) PCT No.: PCT/KR2015/007081
§ 371 (c)(1),
(2) Date: Jan. 9, 2017

(87) PCT Pub. No.: WO2016/010300
PCT Pub. Date: Jan. 21, 2016

(65) Prior Publication Data
US 2017/0204261 A1    Jul. 20, 2017

(30) Foreign Application Priority Data

Jul. 14, 2014 (KR) .................. 10-2014-0088600

(51) Int. Cl.
| | |
|---|---|
| C08L 33/08 | (2006.01) |
| C09D 5/02 | (2006.01) |
| B65D 65/42 | (2006.01) |
| C09D 133/08 | (2006.01) |
| B65D 75/36 | (2006.01) |

(52) U.S. Cl.
CPC .............. *C08L 33/08* (2013.01); *B65D 65/42* (2013.01); *B65D 75/36* (2013.01); *C09D 5/027* (2013.01); *C09D 133/08* (2013.01)

(58) Field of Classification Search
None
See application file for complete search history.

(56) References Cited

U.S. PATENT DOCUMENTS

| | | | | |
|---|---|---|---|---|
| 4,820,762 A | | 4/1989 | Tsaur | |
| 4,916,171 A | * | 4/1990 | Brown | C04B 20/1033 523/161 |
| 5,340,870 A | * | 8/1994 | Clinnin | C09D 5/004 523/172 |
| 5,686,518 A | * | 11/1997 | Fontenot | C08F 2/24 524/458 |
| 5,739,196 A | * | 4/1998 | Jenkins | C08F 2/26 523/201 |
| 5,962,571 A | * | 10/1999 | Overbeek | C08F 8/30 428/460 |
| 6,160,059 A | * | 12/2000 | Roth | C08F 2/02 526/64 |
| 2002/0107322 A1 | * | 8/2002 | Gebhard | C04B 41/483 524/819 |
| 2006/0052529 A1 | * | 3/2006 | Do Amaral Martins | C08F 2/24 524/800 |
| 2011/0033701 A1 | * | 2/2011 | Gerst | C08F 220/12 428/355 R |
| 2011/0237736 A1 | | 9/2011 | Roller | |
| 2015/0191619 A1 | | 7/2015 | Hermes | |
| 2015/0361202 A1 | | 12/2015 | Choi et al. | |

FOREIGN PATENT DOCUMENTS

| | | | | |
|---|---|---|---|---|
| CA | 2507132 A1 | * | 6/2004 | ............... C08F 2/50 |
| JP | 2004-224946 | | 8/2004 | |
| JP | 2005-120257 | | 5/2005 | |
| JP | 2008-520508 | | 6/2008 | |
| JP | 2009-502564 | | 1/2009 | |
| JP | 2010-018671 | | 1/2010 | |
| JP | 5210736 B2 | * | 6/2013 | |
| KR | 10-1999-0075204 | | 10/1999 | |
| KR | 10-2001-0084640 | | 9/2001 | |
| KR | 10-0521992 | | 10/2005 | |
| KR | 10-2005-0106419 | | 11/2005 | |
| WO | 01-64764 | | 9/2001 | |
| WO | 2014-053282 | | 4/2014 | |

OTHER PUBLICATIONS

Machine translation of JP 5210736 B2, retrieved Feb. 2018. (Year: 2018).*
Machine translation of KR 100521992 B1, retrieved Feb. 2018. (Year: 2018).*
Hwu et al. "Studies of alkali soluble resin as a surfactant in emulsion polymerization", Polymer 2000, 41, 5695-5705. (Year: 2000).*
de Amaral et al. "Novel Industrial Application of Miniemulsion Polymerization—Use of Alkali Soluble Resin as Surfactant in Miniemulsion Polymerizatio" Macromol. Sym. 2005,226,167-176. (Year: 2005).*
Hwu et al. "Monomer Effects in Emulsion Polymerization with ASR as the Surfactant", Journal of Polymer Research, 2002, 9, 183-188. (Year: 2002).*
PCT Search Report & Written Opinion, Patent Cooperation Treaty, Application No. PCT/KR2015/007801, Oct. 2, 2015.

* cited by examiner

*Primary Examiner* — Nicole M Buie-Hatcher
(74) *Attorney, Agent, or Firm* — LEX IP MEISTER, PLLC

(57) ABSTRACT

The present invention provides a polymer emulsion having heat sealability for a blister package, and a method for preparing the same. Since the polymer emulsion of the present invention includes latex particles having an average particle diameter of a nanosize and a low unimodal particle size distribution, it may exhibit uniform and stable emulsion properties, particularly excellent heat sealability, and thus may be suitably used for a blister package and on the like. Furthermore, the polymer emulsion of the present invention is polymerized in an aqueous medium without using an organic solvent, and thus enables provision of a blister package with minimized harmfulness to a human body and the environment.

14 Claims, 2 Drawing Sheets

[Fig. 1]
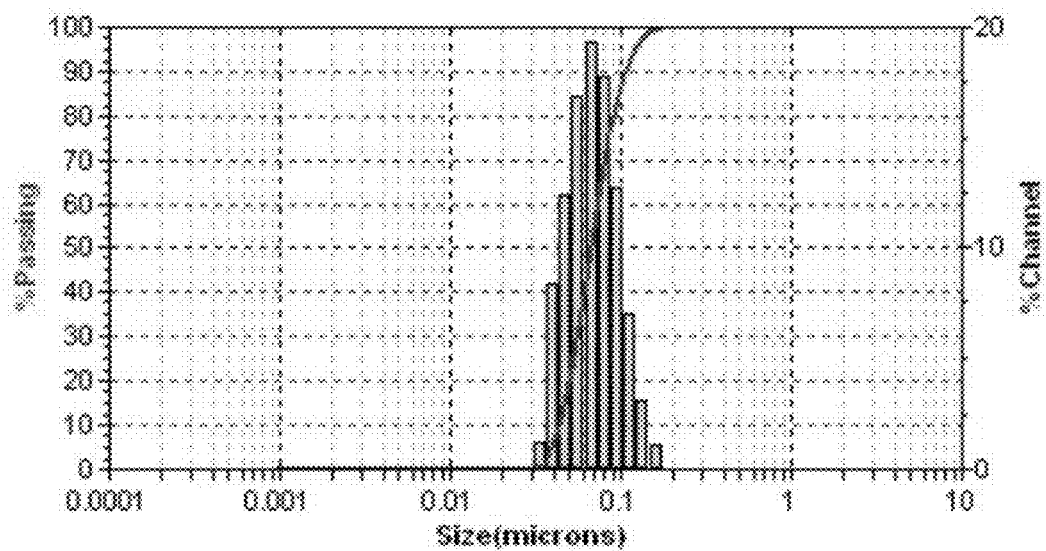
[Fig. 2]
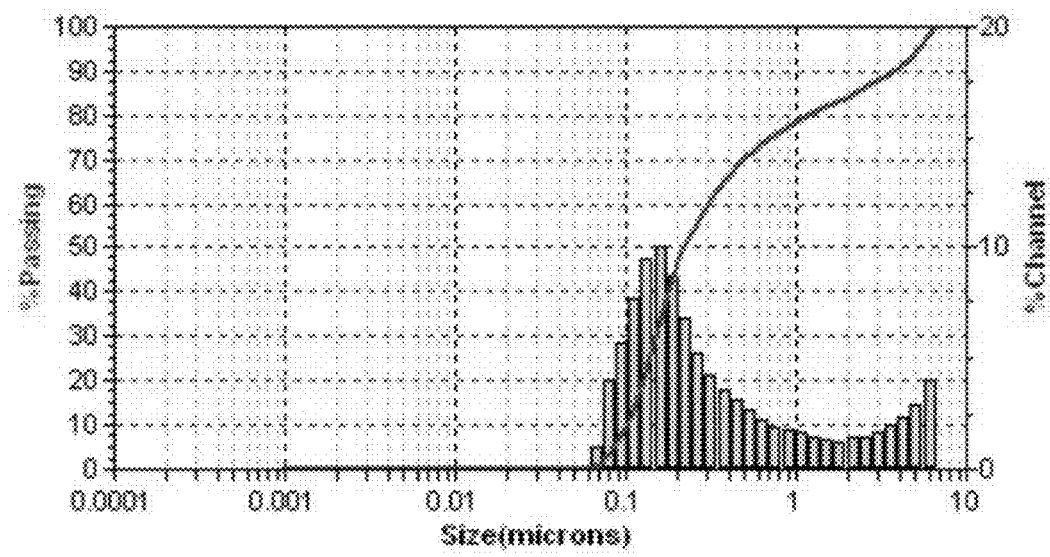

[Fig. 3]
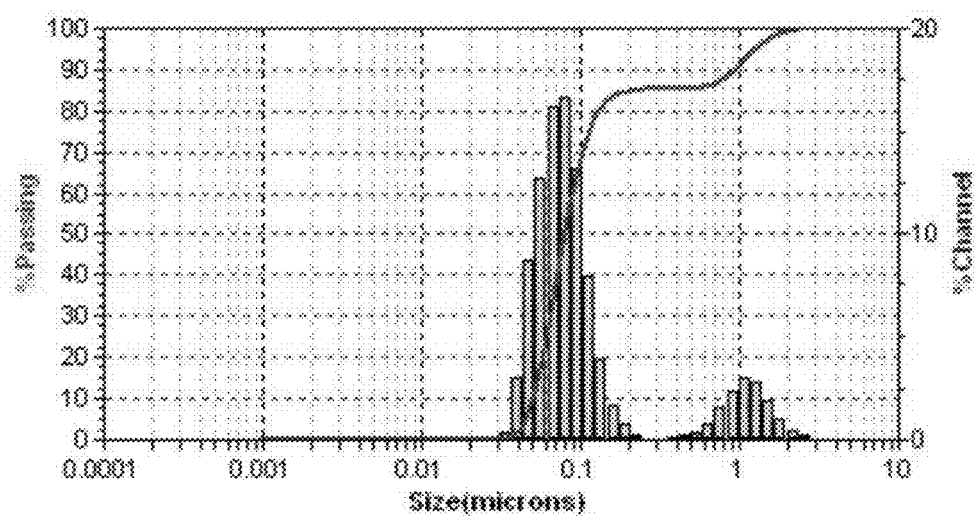

POLYMER EMULSION HAVING HEAT SEALABILITY FOR BLISTER PACKAGE AND PREPARATION METHOD THEREOF

CROSS-REFERENCE TO RELATED APPLICATION

This application claims the benefit of Korean Patent Application No. 10-2014-0088600 filed on Jul. 14, 2014 with the Korean Intellectual Property Office, the disclosure of which is incorporated herein by reference in its entirety.

TECHNICAL FIELD

The present invention provides a polymer emulsion that is applied as a heat sealable coating layer of a blister package, and a method for preparing the same.

BACKGROUND

A blister package is made by heat molding a plastic sheet to form a plastic container having one or a plurality of recessed spaces, putting an article to be stored therein, covering the opening of the container with a substrate such as a plastic film, an aluminum foil, and so on, and adhering the periphery of the article.

Such a blister package may increase the display effect of an article, and indicate a method of use and so on on a substrate part thereof, and thus is applied for packaging of various articles such as foods, batteries, toothbrushes, medicines, stationery, and so on.

In the blister package, the plastic container and the substrate are adhered mainly by heat sealing. For this, a resin having heat sealability is applied for the formation of the plastic container, and a resin having heat sealability is also coated on the substrate.

For example, for the blister package, a forming film, a lidding material, a heat seal coating, and so on, are required. Among them, since the forming film and the lidding material are combined to form one integrated blister package, the adhesion property of the heat seal coating is very important.

Thus, for the resin applied for the heat seal coating of a blister package, stable heat sealability (that is, the property of exhibiting adhesion at high temperature and/or high pressure conditions without exhibiting adhesion at room temperature) is basically required, and coating suitability for the plastic container and the substrate is required.

Previously, an oil-based resin solution was used as a coating solution exhibiting heat sealability. However, due to combustibility of the oil-based resin solution, there is a risk of fire, and an organic solvent may remain in the package.

Particularly, since the blister package is mainly applied for foods, medicines, stationery, and so on, an organic solvent remaining in the package would directly affect on a human body, and thus the oil-based resin solution is not suitable.

In order to compensate the disadvantage, a method of applying a water soluble styrene/acryl-based resin to the heat seal coating of a blister package has been suggested.

However, heat seal coating resins for a blister package suggested until now not only have lowered heat sealability compared to previous oil-based resins under the same temperature conditions (for example, 150 to 160° C.), but also have problems of deformation of the plastic container of the blister package when heated to a temperature at which heat sealing is enabled.

DETAILED DESCRIPTION OF THE INVENTION

Technical Problem

It is an object of the present invention to provide a polymer emulsion having heat sealability for a blister package that has excellent heat sealability and coatability on a substrate, and yet is not harmful to a human body and the environment.

It is another object of the present invention to provide a method for preparing the polymer emulsion having heat sealability for a blister package.

It is still another object of the present invention to provide a blister package including a heat sealable coating layer formed from the polymer emulsion.

Technical Solution

According to the present invention, a polymer emulsion having heat sealability for a blister package includes latex particles wherein a water soluble polymer emulsifier having a weight average molecular weight of 6000 to 23,000 g/mol, a glass transition temperature of 100 to 150° C., and an acid value of 100 to 230 mg KOH/g covers a polymer derived from ethylenically unsaturated monomers.

According to the present invention, a method for preparing a polymer emulsion having heat sealability for a blister package includes the step of emulsion polymerizing ethylenically unsaturated monomers, in an aqueous medium in which a water soluble polymer emulsifier having a weight average molecular weight of 6000 to 23,000 g/mol, a glass transition temperature of 100 to 150° C., and an acid value of 100 to 230 mg KOH/g exists.

According to the present invention, a blister package including a heat sealable coating layer formed from the polymer emulsion is also provided.

Hereinafter, a polymer emulsion having heat sealability for a blister package, a method for preparing the same, and the like according to the embodiments of the present invention will be explained.

In the present specification, technical terms are only for referring to specific embodiments, and they are not intended to limit the present invention unless explicitly stated otherwise.

Further, singular expressions used herein may include plural expressions unless they are differently expressed contextually.

In addition, the meaning of the word "comprise" used in the specification embodies specific characteristics, areas, essences, steps, actions, elements, and/or components, and does not exclude existence or addition of other specific characteristics, areas, essences, steps, actions, elements, components, and/or groups.

I. Polymer Emulsion Having Heat Sealability for Blister Package

According to one embodiment of the present invention, a polymer emulsion having heat sealability for a blister package includes latex particles, wherein a water soluble polymer emulsifier having a weight average molecular weight of 6,000 to 23,000 g/mol, a glass transition temperature of 100 to 150° C., and an acid value of 100 to 230 mg KOH/g covers a polymer derived from ethylenically unsaturated monomers.

As the result of continuous experiments by the present inventors, it was confirmed that if emulsion polymerization of ethylenically unsaturated monomers is conducted using a water soluble polymer satisfying specific properties as an emulsifier, latex particles having an average particle diameter of a nanosize and a low unimodal particle size distribution are formed, and uniform and stable emulsion properties may be exhibited.

It was also confirmed that the polymer emulsion formed by the method not only has excellent coatability on a substrate but also exhibits improved heat sealability, and thus may be particularly suitably used for a heat sealable coating layer of a blister package.

Further, since the polymer emulsion is polymerized in an aqueous medium without using an organic solvent, harmfulness to a human body and the environment due to the residual solvents may be minimized, thus enabling provision of a safer blister package.

According to the embodiment of the present invention, the polymer emulsion having heat sealability for a blister package (hereinafter referred to as a 'polymer emulsion') includes a continuous phase including water, and latex particles dispersed in the continuous phase. In addition, the latex particles have a form wherein a water soluble polymer emulsifier covers a polymer derived from ethylenically unsaturated monomers.

(Water Soluble Polymer Emulsifier)

First, the latex particles included in the polymer emulsion are formed using the water soluble polymer as an emulsifier, and particularly, the water soluble polymer emulsifier has a weight average molecular weight of 6,000 to 23,000 g/mol and a glass transition temperature ($T_g$) of 100 to 150° C.

Since the polymer emulsion is formed using a water soluble polymer emulsifier satisfying the above properties, it may include latex particles having an average particle diameter of a nanosize and a low unimodal particle size distribution.

That is, in order to form a stable emulsion having a low unimodal particle size distribution, it is preferable that the water soluble polymer emulsifier has a weight average molecular weight of 6,000 to 23,000 g/mol, or 6,500 to 23,000 g/mol, or 6,500 to 20,000 g/mol, or 6,500 to 18,000 g/mol, or 7,000 to 18,000 g/mol, or 7,000 to 15,000 g/mol, or 7,000 to 13,000 g/mol, or 7,000 to 10,000 g/mol.

In order to form a stable emulsion having a low unimodal particle size distribution, it is preferable that the water soluble polymer emulsifier has a glass transition temperature ($T_g$) of 100 to 150° C., or 105 to 150° C., or 105 to 145° C., or 110 to 145° C., or 110 to 140° C., or 115 to 140° C., or 115 to 135° C., or 120 to 135° C., or 120 to 130° C.

If an emulsifier having a weight average molecular weight or a glass transition temperature that does not fall within the above ranges is included, the polymer emulsion including the latex particles may become a gel, or the particle size distribution of the latex may become bimodal, and so on, and thus it may be difficult to exhibit the properties of a polymer emulsion having heat sealability for a blister package required in the present invention.

Meanwhile, the water soluble polymer emulsifier not only has water solubility, but also simultaneously has a hydrophilic part and a lipophilic part, and thus may be used as an emulsifier at the time of aqueous emulsion polymerization. Such a water soluble polymer emulsifier enables reinforcing the properties of latex particles formed by emulsion polymerization, and thereby a polymer emulsion having more stable emulsion properties may be provided.

As used herein, 'water soluble' means that 10 g or more of a polymer is dissolved in 1 liter of deionized water having a pH of 7 or more at room temperature, for example.

Further, the behavior of the water soluble emulsifier in an aqueous solvent may be determined according to an acid value, and it may have an influence on the number or size of a micelle. Considering this, it is preferable that the water soluble emulsifier has an acid value of 100 to 230 mg KOH/g, or 100 to 220 mg KOH/g, or 120 to 220 mg KOH/g, or 150 to 220 mg KOH/g.

That is, in order to sufficiently exhibit water solubility, it is preferable that the acid value of the water soluble polymer emulsifier is 100 mg KOH/g or more. However, if the acid value of the emulsifier is higher than necessary, it may be difficult to form a micelle and exhibit the properties, and thus it is preferable that the acid value of the water soluble polymer emulsifier is 230 mg KOH/g or less.

Such a water soluble polymer emulsifier may be a polymer derived from ethylenically unsaturated monomers, or it may be obtained by common polymerization such as free radical polymerization (as a non-limiting example, bulk polymerization), and so on.

According to one embodiment of the invention, the water soluble polymer emulsifier may be a polymer derived from ethylenically unsaturated monomers represented by the following Chemical Formula A.

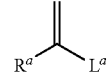

[Chemical Formula A]

In Chemical Formula A, $R^a$ is hydrogen or a methyl group, $L^a$ is a phenyl group or a —C(=O)—OR$^m$ group, and $R^m$ is hydrogen or a C1-10 linear or branched alkyl group.

Preferably, the water soluble polymer emulsifier is derived from at least two kinds of ethylenically unsaturated monomers represented by the above Chemical Formula A; and more preferably, it may be a polymer derived from a monomer mixture including styrene monomers represented by the following Chemical Formula A-1 and one or more kinds of acryl monomers selected from the group consisting of the compounds represented by the following Chemical Formula A-2 and Chemical Formula A-3.

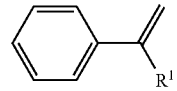

[Chemical Formula A-1]

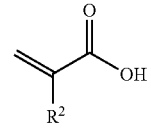

[Chemical Formula A-2]

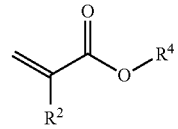

[Chemical Formula A-3]

In Chemical Formulae A-1 to A-3, $R^1$ to $R^3$ are each independently hydrogen or a methyl group, and $R^4$ is a C1-10 linear or branched alkyl group.

That is, the styrene monomers may form a lipophilic part of the water soluble polymer emulsifier and the acryl monomers may form a hydrophilic part of the water soluble polymer emulsifier, thereby enabling the formation of more stable latex particles.

As non-limiting examples, the styrene monomers may be styrene, alpha-methylstyrene, or a mixture thereof; and the acryl monomers may be (meth)acrylic acid, methyl (meth)acrylate, ethyl (meth)acrylate, butyl (meth)acrylate, 2-ethylhexyl (meth)acrylate, or a mixture thereof.

Here, the content ratio of the styrene monomers and the acryl monomers that form the water soluble polymer emulsifier may be controlled within an appropriate range according to the acid value of the emulsifier. According to one embodiment, it is preferable that the water soluble polymer emulsifier is derived from a monomer mixture including the styrene monomers and the acryl monomers at a weight ratio of 1:0.2 to 1:0.8, or 1:0.3 to 1:0.8, or 1:0.3 to 1:0.7, or 1:0.4 to 1:0.7, or 1:0.4 to 1:0.6.

More preferably, it may be favorable in terms of the properties as an emulsifier, the formation of stable latex particles, and the exhibition of the effect of reinforcing the properties of the polymer emulsion for the water soluble polymer emulsifier to be a polymer derived from a monomer mixture including 80 to 90 parts by weight of alpha-methyl styrene and 80 to 90 parts by weight of acrylic acid, based on 100 parts by weight of styrene.

(Polymer Derived from Ethylenically Unsaturated Monomers)

Meanwhile, according to one embodiment of the invention, the polymer emulsion includes latex particles wherein the above-explained water soluble polymer emulsifier covers the polymer derived from ethylenically unsaturated monomers.

The polymer derived from ethylenically unsaturated monomers is a polymer making up the center part of latex particles, and it is formed by the progression of a polymerization reaction of droplets of the ethylenically unsaturated monomers covered with the water soluble polymer emulsifier by an initiator.

Here, the polymer making up the center part of the latex particles may be derived from ethylenically unsaturated monomers represented by the following Chemical Formula B.

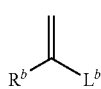

[Chemical Formula B]

In Chemical Formula B, $R^b$ is hydrogen or a methyl group, $L^b$ is a phenyl group or a —C(=O)—OR″ group, and R″ is hydrogen or a C1-10 linear or branched alkyl group.

Preferably, the polymer is derived from at least two kinds of ethylenically unsaturated monomers represented by the above Chemical Formula B; and more preferably, it may be derived from a monomer mixture including styrene monomers represented by the following Chemical Formula B-1, and one or more kinds of acryl monomers selected from the group consisting of the compounds represented by the following Chemical Formulae B-2 and B-3.

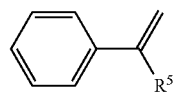

[Chemical Formula B-1]

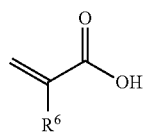

[Chemical Formula B-2]

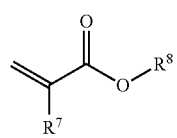

[Chemical Formula B-3]

In Chemical Formulae B-1 to B-3, $R^5$ to $R^7$ are each independently hydrogen or a methyl group, and $R^8$ is a C1-10 linear or branched alkyl group.

The ethylenically unsaturated monomers used for the formation of the polymer making up the center part of the latex particles may be identical to or different from the ethylenically unsaturated monomers forming the above-explained water soluble polymer emulsifier.

As non-limiting examples, the styrene monomers may be styrene, alpha-methylstyrene, or a mixture thereof; and the acryl monomers may be (meth)acrylic acid, methyl (meth)acrylate, ethyl (meth)acrylate, butyl (meth)acrylate, 2-ethylhexyl (meth)acrylate, or a mixture thereof.

Further, according to one embodiment of the invention, in order to provide more stable and improved heat sealability for the polymer emulsion, it is preferable that the acryl monomer is a compound having a glass transition temperature ($T_g$) of −70 to 30° C. That is, a blister package should have an excellent anti-blocking property without exhibiting sticking or adhesion at room temperature, and should exhibit heat sealability above a specific temperature. As such, in order to stably exhibit the anti-blocking property at room temperature and heat sealability at a high temperature, it is preferable that acryl monomers having a glass transition temperature of 30° C. or less are used.

The content ratio of the styrene monomers and the acryl monomers that are used for the formation of the polymer making up the center part of the latex particles may have an influence on the heat sealability of the polymer emulsion. According to one embodiment, it is preferable that the polymer making up the center part of the latex particles is derived from a monomer mixture including the styrene monomers and the acryl monomers at a weight ratio of 1:1.5 to 1:10, or 1:2.0 to 1:10, or 1:2.0 to 1:9.5, or 1:2.5 to 1:9.5, or 1:2.5 to 1:9.0.

More preferably, it may be advantageous in terms of exhibition of the heat sealability of the polymer emulsion for the polymer making up the center part of the latex particles to be a polymer derived from a monomer mixture including 150 to 900 parts by weight of butyl acrylate ($T_g$: −54° C.), based on 100 parts by weight of styrene.

(Latex Particles)

Meanwhile, according to one embodiment of the invention, the latex particles may include the water soluble polymer emulsifier in an amount of 10 to 20 wt % based on the polymer derived from the ethylenically unsaturated monomers.

If the content of the water soluble polymer emulsifier is too small, sufficient stability may not be provided for the latex particles, and thus agglomeration may be generated in the polymer emulsion. Thus, it is preferable that the water soluble polymer emulsifier is included in an amount of 10 wt % or more, based on the polymer derived from the ethylenically unsaturated monomers (polymer making up the center part of the latex particles).

However, if the emulsifier is excessively included, water resistance, alcohol resistance, and so on of a heat sealable coating layer formed using the polymer emulsion may decrease. Thus, it is preferable that the water soluble polymer emulsifier is included in an amount of 20 wt % or less, based on the polymer derived from the ethylenically unsaturated monomers (polymer making up the center part of the latex particles).

Further, since the latex particles included in the polymer emulsion consist of the above-explained resins, they may exhibit an average particle diameter of a nanosize and a low unimodal particle size distribution.

Specifically, the latex particles may exhibit a unimodal particle size distribution with an average particle diameter of 45 to 65 nm. In this regard, if the latex particles included in the emulsion have a bimodal particle size distribution, compared to the unimodal particle size distribution, a turbid emulsion is formed, a conversion rate is low, and storage stability is lowered.

That is, the emulsion including the latex particles having a unimodal particle size distribution of one embodiment of the invention may exhibit a relatively transparent appearance and excellent storage stability. Particularly, since the latex particles included in the emulsion exhibit a unimodal particle size distribution, excellent coatability may be exhibited at the time of surface coating, and thus more stable heat sealability may be exhibited.

The polymer emulsion including such latex particles exhibits a glass transition temperature (Tg) of 10° C. or less, or −30 to 10° C., or −20 to 5° C., and thus may exhibit an anti-blocking property at room temperature and heat sealability at a high temperature.

The polymer emulsion may exhibit a solid content of 40 to 60 wt % and an acid value of 50 to 100 mg KOH/g.

II. Method for Preparing a Polymer Emulsion Having Heat Sealability for a Blister Package According to another embodiment of the invention, a method for preparing a polymer emulsion having heat sealability for a blister package includes the step of emulsion polymerizing ethylenically unsaturated monomers in an aqueous medium in which a water soluble polymer emulsifier having a weight average molecular weight of 6,000 to 23,000 g/mol, a glass transition temperature of 100 to 150° C., and an acid value of 100 to 230 mg KOH/g exists.

The above preparation method is one example of preparing the above-explained polymer emulsion having heat sealability for a blister package through emulsion polymerization, and particularly, is conducted using a water soluble polymer satisfying the above-explained properties as an emulsifier. Further, since the step of emulsion polymerization is conducted in an aqueous medium without using an organic solvent, harmfulness to a human body and the environment due to the residual solvent may be minimized.

In the emulsion polymerization step, as an emulsifier, a water soluble polymer emulsifier having a weight average molecular weight of 6,000 to 23,000 g/mol and a glass transition temperature ($T_g$) of 100 to 150° C. is used. It is preferable that the water soluble polymer emulsifier has an acid value of 100 to 230 mg KOH/g. The detailed explanations of the weight average molecular weight, glass transition temperature, and acid value of the water soluble polymer emulsifier are as explained with regard to the polymer emulsion.

The water soluble polymer emulsifier may be a polymer derived from ethylenically unsaturated monomers represented by the above Chemical Formula A. Preferably, it may be a polymer derived from a monomer mixture including styrene monomers represented by the following Chemical Formula A-1, and one or more kinds of acryl monomers selected from the group consisting of the compounds represented by the above Chemical Formula A-2 and Chemical Formula A-3.

As non-limiting examples, the styrene monomers may be styrene, alpha-methylstyrene, or a mixture thereof; and the acryl monomers may be (meth)acrylic acid, methyl (meth)acrylate, ethyl (meth)acrylate, butyl (meth)acrylate, 2-ethylhexyl (meth)acrylate, or a mixture thereof.

Here, the content ratio of the styrene monomers and the acryl monomers that form the water soluble polymer emulsifier may be controlled within an appropriate range according to the acid value of the emulsifier.

According to one embodiment, it is preferable that the water soluble polymer emulsifier is derived from a monomer mixture including the styrene monomers and the acryl monomers at a weight ratio of 1:0.2 to 1:0.8, or 1:0.3 to 1:0.8, or 1:0.3 to 1:0.7, or 1:0.4 to 1:0.7, or 1:0.4 to 1:0.6.

More preferably, it may be favorable in terms of the properties as an emulsifier, the formation of stable latex particles, and the exhibition of the effect of reinforcing the properties of the polymer emulsion for the water soluble polymer emulsifier to be a polymer derived from a monomer mixture including 80 to 90 parts by weight of alpha-methyl styrene and 80 to 90 parts by weight of acrylic acid, based on 100 parts by weight of styrene.

Meanwhile, the water soluble polymer emulsifier exists while being dissolved in an aqueous medium (for example, deionized water and so on), and in order to dissolve the water soluble polymer emulsifier, ammonia and so on may be added.

Herein, it is preferable that the water soluble polymer emulsifier exists in an amount of 10 to 20 wt % based on the ethylenically unsaturated monomers used in the emulsion polymerization step.

That is, if the content of the water soluble polymer emulsifier is too small, sufficient stability may not be provided for the latex particles, and thus agglomeration may be generated in the polymer emulsion.

Thus, it is preferable that the water soluble polymer emulsifier exists in an amount of 10 wt % or more, based on the ethylenically unsaturated monomers. However, if the emulsifier is excessively included, water resistance, alcohol resistance, and so on of a heat sealable coating layer formed using the polymer emulsion may decrease. Thus, it is preferable that the water soluble polymer emulsifier exists in an amount of 20 wt % or less, based on the ethylenically unsaturated monomers.

The aqueous medium in which the water soluble polymer emulsifier exists is heated to a reaction temperature, and an initiator may be introduced.

Here, the reaction temperature of the emulsion polymerization step may be controlled to 70 to 100° C.

The initiator may be introduced at one time at the beginning of the reaction, but in order to increase reactivity and form a stable polymer emulsion, it is preferable that the initiator is dividedly introduced two or more times.

As the initiator, common compounds known to be applicable for emulsion polymerization in the technical field to which the present invention pertains may be used without specific limitations. However, according to one embodiment of the invention, the initiator may be persulfate compounds such as ammonium persulfate, potassium persulfate, and sodium persulfate.

Subsequently, ethylenically unsaturated monomers to be emulsion polymerized are introduced into the aqueous medium. The ethylenically unsaturated monomers may be a compound represented by the above Chemical Formula B.

Preferably, the ethylenically unsaturated monomers may include styrene monomers represented by the above Chemical Formula B-1, and one or more kinds of acryl monomers selected from the group consisting of the compounds represented by the above Chemical Formulae B-2 and B-3.

As non-limiting examples, the styrene monomers may be styrene, alpha-methylstyrene, or a mixture thereof; and the acryl monomers may be (meth)acrylic acid, methyl (meth)acrylate, ethyl (meth)acrylate, butyl (meth)acrylate, 2-ethylhexyl (meth)acrylate, or a mixture thereof.

According to one embodiment of the invention, in order to provide more stable and improved heat sealability for the polymer emulsion, it is preferable that the acryl monomer is a compound having a glass transition temperature ($T_g$) of −70 to 30° C.

That is, a blister package should have an excellent anti-blocking property without exhibiting sticking or adhesion at room temperature, and should exhibit heat sealability above a specific temperature.

As such, in order to stably exhibit the anti-blocking property at room temperature and heat sealability at a high temperature, it is preferable that acryl monomers having a glass transition temperature of 30° C. or less are used.

The content ratio of the styrene monomers and the acryl monomers may have an influence on the heat sealability of the polymer emulsion. According to one embodiment, it is preferable that the ethylenically unsaturated monomers include the styrene monomers and the acryl monomers at a weight ratio of 1:1.5 to 1:10, or 1:2.0 to 1:10, or 1:2.0 to 1:9.5, or 1:2.5 to 1:9.5, or 1:2.5 to 1:9.0.

More preferably, it may be advantageous in terms of exhibition of the heat sealability of the polymer emulsion that the ethylenically unsaturated monomers include 150 to 900 parts by weight of butyl acrylate ($T_g$: −54° C.), based on 100 parts by weight of styrene.

The ethylenically unsaturated monomers may be continuously introduced while the emulsion polymerization is conducted (for example, for 60 to 200 minutes).

In such an emulsion polymerization step, the ethylenically unsaturated monomers introduced into the aqueous medium form a droplet covered with the water soluble polymer emulsifier, and a polymerization reaction is progressed by the initiator, through which a polymer emulsion including the above-explained latex particles is formed.

III. Blister Package

According to still another embodiment of the invention, a blister package including a heat sealable coating layer formed from the above-explained polymer emulsion is provided.

That is, the heat sealable coating layer is formed using the above-explained polymer emulsion, and it may be applied for a blister package of a common structure such as a forming film, a lidding material, and so on.

For example, the blister package may include a base film made of polyvinyl chloride (PVC), polychlorotrifluoroethylene (PCTFE), a cyclic olefin copolymer (COC), and so on, and on one side of the base film (for example, made of paper or Al foil), a heat sealable coating layer formed using the above-explained polymer emulsion may be formed.

Herein, for the formation of the heat sealable coating layer, common coating apparatuses and coating methods such as wire bar coating and so on may be applied.

Advantageous Effects

The polymer emulsion of the present invention includes latex particles having an average particle diameter of a nanosize and a low unimodal particle size distribution, and thus may exhibit uniform and stable emulsion properties, particularly excellent heat sealability, and may be appropriately used for a blister package and so on.

Furthermore, the polymer emulsion of the present invention is polymerized in an aqueous medium without using an organic solvent, thus enabling the provision of a blister package with minimized harmfulness to a human body and the environment.

BRIEF DESCRIPTION OF THE DRAWINGS

FIG. 1 is a graph showing the particle size distribution of the polymer emulsion according to Example 1 of the present invention.

FIG. 2 is a graph showing the particle size distribution of the polymer emulsion according to Comparative Example 1.

FIG. 3 is a graph showing the particle size distribution of the polymer emulsion according to Comparative Example 2.

DETAILED DESCRIPTION OF THE EMBODIMENTS

Hereinafter, preferable examples are presented for the complete understanding of the preset invention. However, these examples are intended only to illustrate the present invention, and the present invention is not limited thereto.

Example 1

A water soluble polymer emulsifier (product name S-70; manufactured by Hanwha Chemical; weight average molecular weight of 7,000 g/mol; glass transition temperature (Tg) of 120° C.; acid value of 218 mg KOH/g; bulk polymer derived from about 84.2 parts by weight of alpha-methylstyrene and about 87.5 parts by weight of acrylic acid, based on 100 parts by weight of styrene) was prepared.

Into a 5 L reactor, 122 g of the water soluble polymer emulsifier (about 35 wt %, based on the following monomer mixture) was dissolved in 30 ml of an ammonia aqueous solution, and then, while raising the temperature to 86° C., ammonium persulfate (APS) was dividedly introduced as an initiator. A monomer mixture including styrene and butyl acrylate at a weight ratio of 1:2.6 was semi-continuously introduced into the reactor, thus obtaining a polymer emulsion including latex particles by emulsion polymerization.

Example 2

A water soluble polymer emulsifier (product name S-120; manufactured by Hanwha Chemical; weight average molecular weight of 12,500 g/mol; glass transition temperature (Tg) of 130° C.; acid value of 218 mg KOH/g; bulk polymer derived from about 84.2 parts by weight of alpha-methylstyrene and about 87.5 parts by weight of acrylic acid, based on 100 parts by weight of styrene) was prepared.

Into a 5 L reactor, 122 g of the water soluble polymer emulsifier (about 35 wt %, based on the following monomer mixture) was dissolved in 30 ml of an ammonia aqueous solution, and then, while raising the temperature to 86° C., ammonium persulfate (APS) was dividedly introduced as an initiator. A monomer mixture including styrene and butyl acrylate at a weight ratio of 1:2.6 was semi-continuously introduced into the reactor, thus obtaining a polymer emulsion including latex particles by emulsion polymerization.

Example 3

A polymer emulsion was obtained by the same method as Example 2, except that a monomer mixture including styrene and butyl acrylate at a weight ratio of 1:3.5 was semi-continuously introduced into a reactor in which a water soluble polymer emulsifier and an initiator existed, thus progressing emulsion polymerization.

Example 4

A polymer emulsion was obtained by the same method as Example 2, except that a monomer mixture including styrene and butyl acrylate at a weight ratio of 1:5 was semi-continuously introduced into a reactor in which a water soluble polymer emulsifier and an initiator existed, thus progressing emulsion polymerization.

Example 5

A polymer emulsion was obtained by the same method as Example 2, except that a monomer mixture including styrene and butyl acrylate at a weight ratio of 1:7 was semi-continuously introduced into a reactor in which a water soluble polymer emulsifier and an initiator existed, thus progressing emulsion polymerization.

Example 6

A polymer emulsion was obtained by the same method as Example 2, except that a monomer mixture including styrene and butyl acrylate at a weight ratio of 1:9 was semi-continuously introduced into a reactor in which a water soluble polymer emulsifier and an initiator existed, thus progressing emulsion polymerization.

Comparative Example 1

A polymer emulsion was obtained by the same method as Example 1, except that a water soluble polymer emulsifier (product name S-60L; manufactured by Hanwha Chemical; weight average molecular weight of 8,000 g/mol; glass transition temperature (Tg) of 38° C.; acid value of 80 mg KOH/g; bulk polymer derived from 5.8 wt % of acrylic acid, 33.7 wt % of ethyl acrylate, 6 wt % of methacrylic acid, and 54.5 wt % of methyl methacrylate) was used.

Comparative Example 2

A polymer emulsion was obtained by the same method as Example 1, except that a water soluble polymer emulsifier (product name S-150L; manufactured by Hanwha Chemical; weight average molecular weight of 15,000 g/mol; glass transition temperature (Tg) of 60° C.; acid value of 80 mg KOH/g; bulk polymer derived from 5.8 wt % of acrylic acid, 33.7 wt % of ethyl acrylate, 6 wt % of methacrylic acid, and 54.5 wt % of methyl methacrylate) was used.

Comparative Example 3

A polymer emulsion was obtained by the same method as Example 1, except that a water soluble polymer emulsifier (product name S-160L; manufactured by Hanwha Chemical; weight average molecular weight of 16,000 g/mol; glass transition temperature (Tg) of 78° C.; acid value of 230 mg KOH/g; bulk polymer derived from 37 wt % of acrylic acid, 7.5 wt % of butyl acrylate, and 55.5 wt % of styrene and alpha-methylstyrene) was used.

Experimental Example

For the polymer emulsions obtained through examples and comparative examples, the following experiments were conducted, and the results are shown in the following Tables 1 and 2 and FIGS. 1 to 3.

(1) Glass transition temperature (Tg): A glass transition temperature was measured by differential scanning calorimetry (DSC), and at the time of measurement, a temperature range was −50 to 200° C. and a temperature rising speed was 10° C./min.

(2) Acid value: The acid value of resin was measured by dissolving about 1.0 g of each polymer emulsion in about 50 g of tetrahydrofuran (THF), then adding 5 to 6 ml of a phenolphthalein solution (concentration 1%), and titrating with a potassium hydroxide standard solution (KOH 0.1 N).

(3) The average particle diameter, solid content, and particle size distribution of latex particles included in the polymer emulsion were measured using a particle size analyzer (model name: NANOTRAC)

(4) Peel strength: Each polymer emulsion was coated on an Al foil to a thickness of about 6.8 μm, dried in an oven at 100° C. for 1 minute, and then dried at room temperature for 30 minutes or more. The dried coated Al foil was heat laminated with a PVC film using a heat laminator to manufacture a specimen. The peel strength between the Al foil and the PVC film was measured using a universal tension testing machine, wherein the peel strength was measured 5 times and the average value is shown in the following Table 1. Here, it can be seen that heat sealability is better as the peel strength is larger.

TABLE 1

| Example | $T_g$ (° C.) | Solid content (wt %) | Average particle diameter (nm) | Viscosity (cps) | pH | Acid value (mg KOH/g) | Peel strength (kgf/cm$^2$) |
|---|---|---|---|---|---|---|---|
| 1 | 0 | 44.6 | 54 | 112 | 8.32 | 71.8 | 0.536 |
| 2 | 2 | 44.55 | 52 | 185 | 8.28 | 71 | 0.322 |
| 3 | −5.7 | 44.6 | 51.2 | 272 | 8.39 | 72 | 0.686 |
| 4 | −10.9 | 44.3 | 47.7 | 291 | 8.44 | 68 | 0.6 |
| 5 | −14.8 | 44.6 | 52.9 | 252 | 8.23 | 69 | 0.419 |
| 6 | −17.1 | 44.07 | 52.9 | 300 | 8.32 | 74 | 0.427 |

TABLE 2

| Comparative Example | $T_g$ (° C.) | Solid content (wt %) | Average particle diameter (nm) | Viscosity (cps) | pH | Acid value (mg KOH/g) | Peel strength (kgf/cm$^2$) |
|---|---|---|---|---|---|---|---|
| 1 | −13 | 44.4 | bimodal | 23,2300 | 9.3 | 51 | 0.483 |
| 2 | −8 | 43.2 | bimodal | — | — | 1 | — |
| 3 | −4 | 44.2 | bimodal | 13,680 | 8.07 | 60 | 0.531 |

Referring to the tables and drawings, it was confirmed that the polymer emulsions according to the examples include latex particles having a unimodal particle size distribution, as shown in FIG. 1 (Example 1). It was also confirmed that the polymer emulsion of the examples have good properties on the whole, and exhibit appropriate viscosities and excellent peel strengths, and thus are suitable for heat seal coating of a blister package.

To the contrary, as shown in FIG. 2 (Comparative Example 1) and FIG. 3 (Comparative Example 2), the latex particles included in the polymer emulsions of the comparative examples exhibited bimodal particle size distributions. Further, although the polymer emulsions according to the comparative examples exhibited peel strengths equivalent to those of the examples, due to their excessively high viscosities, it was not easy to handle and use them, and particularly, in the case of Comparative Example 2, a gel state was formed, and thus it was impossible to measure the properties.

The invention claimed is:

1. A polymer emulsion having heat sealability for a blister package, comprising
latex particles, wherein a water soluble polymer emulsifier having a weight average molecular weight of 6,000 to 23,000 g/mol, a glass transition temperature of 100 to 150° C., and an acid value of 100 to 230 mg KOH/g covers a polymer derived from ethylenically unsaturated monomers,
wherein the water soluble polymer emulsifier is a polymer derived from a monomer mixture comprising 80 to 90 parts by weight of alpha-methylstyrene and 80 to 90 parts by weight of acrylic acid, based on 100 parts by weight of styrene.

2. The polymer emulsion having heat sealability for a blister package according to claim 1, wherein the ethylenically unsaturated monomer is a compound represented by the following chemical formula B:

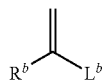

chemical formula B in the chemical formula B,
$R^b$ is hydrogen or a methyl group,
$L^b$ is a phenyl group or a —C(=O)—OR″ group, and
R″ is hydrogen or a C1-10 linear or branched alkyl group.

3. The polymer emulsion having heat sealability for a blister package according to claim 1, wherein the polymer derived from ethylenically unsaturated monomers is a polymer derived from a monomer mixture comprising styrene monomers represented by the following chemical formula B-1, and one or more kinds of acrylic monomers selected from the group consisting of the compounds represented by the following chemical formula B-2 and chemical formula B-3 at a weight ratio of 1:1.5 to 1:10:

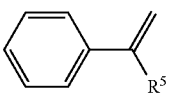

chemical formula B-1

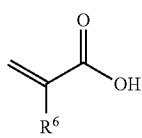

chemical formula B-2

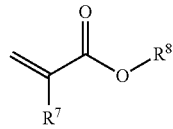

chemical formula B-3 in chemical formulae B-1 to B-3,
$R^5$ to $R^7$ are each independently hydrogen or a methyl group, and
$R^8$ is a C1-10 linear or branched alkyl group.

4. The polymer emulsion having heat sealability for a blister package according to claim 3, wherein the acrylic monomer is a compound having a glass transition temperature ($T_g$) of −70 to 30° C.

5. The polymer emulsion having heat sealability for a blister package according to claim 1, wherein the polymer derived from ethylenically unsaturated monomers is a polymer derived from a monomer mixture comprising 150 to 900 parts by weight of butyl acrylate, based on 100 parts by weight of styrene.

6. The polymer emulsion having heat sealability for a blister package according to claim 1, wherein the latex particle comprises the water soluble polymer emulsifier in an amount of 10 to 20 wt %, based on the polymer derived from ethylenically unsaturated monomers.

7. The polymer emulsion having heat sealability for a blister package according to claim 1, wherein the latex particles have an average particle diameter of 45 to 65 nm.

8. The polymer emulsion having heat sealability for a blister package according to claim 1, wherein the latex particles have a unimodal particle size distribution.

9. The polymer emulsion having heat sealability for a blister package according to claim 1, wherein the polymer emulsion has a glass transition temperature ($T_g$) or 10° C. or less.

10. The polymer emulsion having heat sealability for a blister package according to claim 1, wherein the polymer emulsion has a solid content of 40 to 60 wt %.

11. The polymer emulsion having heat sealability for a blister package according to claim 1, wherein the polymer emulsion has an acid value of 50 to 100 mg KOH/g.

12. A method for preparing the polymer emulsion having heat sealability for a blister package according to claim 1, comprising the step of
emulsion polymerizing ethylenically unsaturated monomers in an aqueous medium in which a water soluble polymer emulsifier having a weight average molecular weight of 6,000 to 23,000 g/mol, a glass transition temperature of 100 to 150° C., and an acid value of 100 to 230 mg KOH/g exists,
wherein the water soluble polymer emulsifier is a polymer derived from a monomer mixture comprising 80 to 90 parts by weight of alpha-methylstyrene and 80 to 90 parts by weight of acrylic acid, based on 100 parts by weight of styrene.

13. The method according to claim 12, wherein the emulsion polymerization is conducted at a reaction temperature of 70 to 100° C.

14. A blister package comprising a heat sealable coating layer formed from the polymer emulsion of claim 1.

* * * * *